Feb. 11, 1941.   J. J. McCARTHY   2,231,392
INTERNAL COMBUSTION ENGINE
Filed Jan. 26, 1939   2 Sheets-Sheet 1

INVENTOR:
John J. McCarthy
by Dike, Calver & Gray
Attys.

Feb. 11, 1941.   J. J. McCARTHY   2,231,392
INTERNAL COMBUSTION ENGINE
Filed Jan. 26, 1939   2 Sheets-Sheet 2
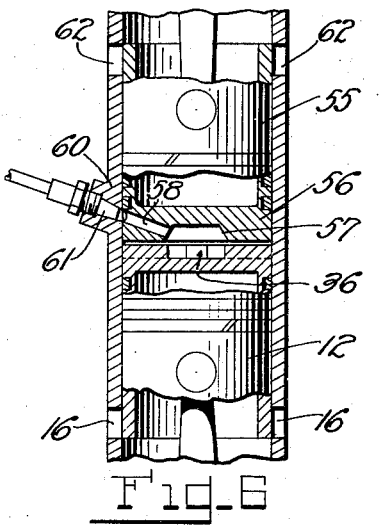
Fig_6
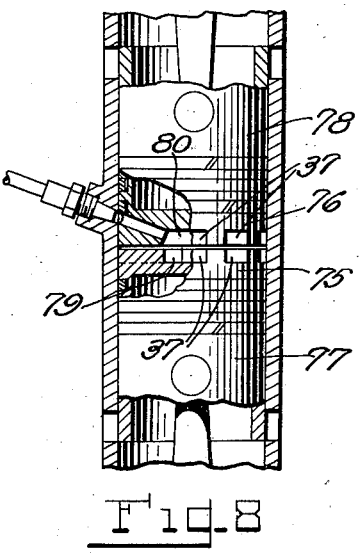
Fig_8
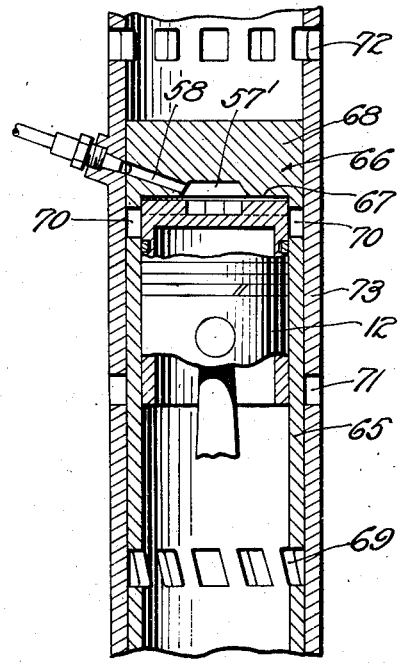
Fig_7
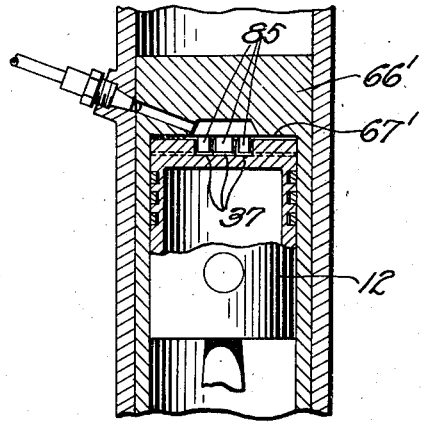
Fig_9
INVENTOR:
John J. McCarthy
by Dike, Calver & Gray
Attys.

UNITED STATES PATENT OFFICE 2,231,392

INTERNAL COMBUSTION ENGINE

John J. McCarthy, Malden, Mass.

Application January 26, 1939, Serial No. 252,908

2 Claims. (Cl. 123—50)

This invention relates to internal combustion engines, and more particularly to engines of the compression-ignition and solid-injection type.

It is the primary aim and object of the present invention greatly to increase the heretofore attainable turbulence of the air in the combustion chamber of a cylinder so that the therein injected fuel will be quickly and thoroughly atomized by the turbulent air and result in an instantaneous combustion.

This and other objects of the present invention are accomplished by so conducting during the intake period supercharged air into the cylinder that said air whirls therein substantially about the cylinder axis, and by providing in the head of the working piston in said cylinder an annular recess and a plurality of angularly spaced grooves converging from the piston periphery substantially tangentially into said recess. These grooves are furthermore so arranged that they redirect, without reversing, the whirling air into said recess at an obtuse angle with its whirling direction during the compression stroke of said piston. Most of the air in the cylinder is in this manner redirected from the cylinder chamber into the smaller recess in the piston head during the entire compression stroke of the piston with the result that the air attains a steadily increasing turbulence in said recess and attains its maximum turbulence at the instant of combustion, i. e., when the fuel is injected into said recess in a manner described detailedly in the following specification. This maximum turbulence was heretofore unattainable with the conventional turbulence-creating structures, and is now attainable by reason of the herein taught continuous redirection of the air in the cylinder into said recess in the piston head.

Before explaining in detail the present invention, it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

In the drawings:

Fig. 6 is a fragmentary, longitudinal section through a cylinder of an opposed-piston type engine that embodies the present invention.

Fig. 7 is a fragmentary, longitudinal section through a cylinder of another opposed-piston type engine that embodies the present invention.

Fig. 8 is a fragmentary section similar to Fig. 6 and illustrates a modified embodiment of the present invention.

Fig. 9 is a fragmentary section similar to Fig. 7 and illustrates a modified embodiment of the present invention.

Figure 1:
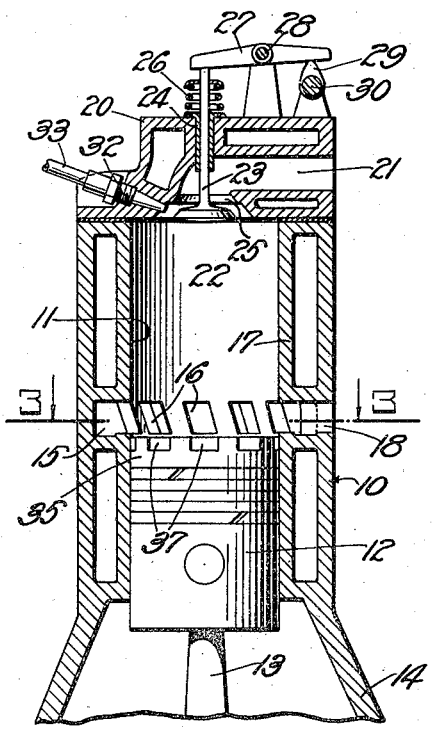
Fig. 1 is a longitudinal section through one cylinder of an internal combustion engine which embodies the present invention.

Referring to the drawings, and more particularly to Fig. 1 thereof, the reference numeral 10 designates a water-jacketed cylinder block of which one of the cylinders is indicated at 11. As the present invention is fully incorporated in each and every cylinder, only one cylinder will be described in detail hereafter. Slidable in the cylinder 11 is a working piston 12, having a conventional rod connection 13 with a crank shaft (not shown) which is suitably mounted in a crank case 14. The cylinder block 10 is provided with a cored-out annular passage 15 (see also Fig. 3) which surrounds each cylinder 11 and communicates with the latter through a plurality of ports 16 in the cylinder wall 17. The annular passage 15 has an inlet 18 which communicates with any suitable intake manifold (not shown). Air from any conventional supercharger (not shown) is conducted through said intake manifold and inlet 18 into the annular passage 15, and thence into the cylinder 11 through the ports 16 when the latter are not covered by the piston 12. Mounted on top of the cylinder block 10 is a cylinder head 20 which is provided with an exhaust conduit 21, leading from the interior of the cylinder 11 or "cylinder chamber" 22, into a non-disclosed exhaust manifold. Communication through the exhaust conduit 21 is normally intercepted by an exhaust valve 23 of the poppet type which is suitably guided in a bushing 24 and normally urged into engagement with its seat 25 by means of a suitably applied compression spring 26. The exhaust valve 23 is lifted from its seat 25 during a predetermined portion of each piston cycle by means of a rocker 27 which is suitably journalled at 28 on top of the cylinder head 20 and actuated by a cam 29 on a shaft 30 which may be driven in any suitable manner (not shown) in timed relation with the crank shaft. Also mounted in the cylinder head 20 is a fuel injector 32 which communicates through a conduit 33 with a suitably operated fuel pump (not shown) of any conventional type.

The head 35 of the working piston 12 is provided with a central annular recess 36 and a plurality of equi-angularly spaced grooves 37 which converge from the piston periphery substantially tangentially into said annular recess 36. The grooves 37 are arranged in the manner best shown in Fig. 3, and the before-mentioned intake ports 16 in the cylinder wall 17, are preferably so tangentially arranged that they form a continuation of said grooves 37.

It will be understood that the intake ports 16 are closed by the working piston 12, except when the latter moves through a preassigned portion of each cycle, including its outer dead center position, and uncovers said ports as shown in Fig. 1. It also appears from Fig. 3 that the annular air-distributing passage 15 merges tangentially into the latter so that the therein admitted, supercharged air circulates in the direction of the arrow r through said passage 15 and enters the piston chamber 22 substantially tangentially thereof through the intake ports 16 when the latter are uncovered by the piston 12. Hence, the supercharged air admitted into the cylinder chamber 22 through the intake ports 16 will whirl in said cylinder chamber substantially about the cylinder axis and in an annular path of which the dot-and-dash line circle $x$ in Fig. 3 may, for instance, be the mean diameter.

Figure 3:
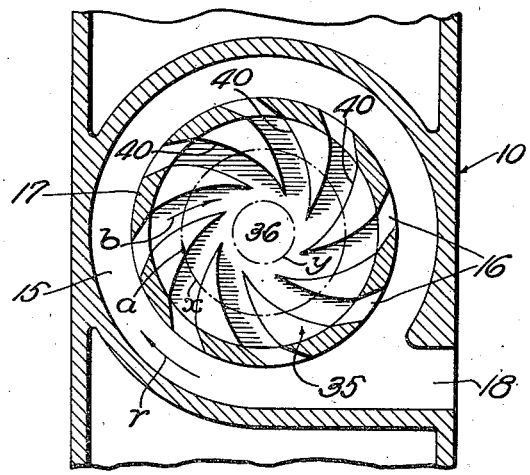
Fig. 3 is an enlarged, fragmentary section, taken on the line 3—3 of Fig. 1.

Immediately after the working piston 12 has started on its compression stroke, the whirling air in the cylinder chamber 22 will impinge on the side walls 40 (Fig. 3) of the grooves 37 in the piston head 35 and be redirected by said grooves into the annular recess 36, wherein the redirected air will whirl in an annular path of which the dot-and-dash line circle $y$ in Fig. 3 may, for instance, be the mean diameter. The whirling air in the cylinder chamber 22 is thus redirected into said annular recess 36 during the compression stroke of the piston, with the result that the continuously redirected air increases the whirl of the previously redirected air in said recess 36 and also builds up a rapidly whirling air column directly above said recess 36. As the piston 12 almost reaches its inner dead center position, i. e., just before fuel injection and immediate combustion takes place, the air in the recess 36 obviously attains its greatest turbulence.

Figure 2:
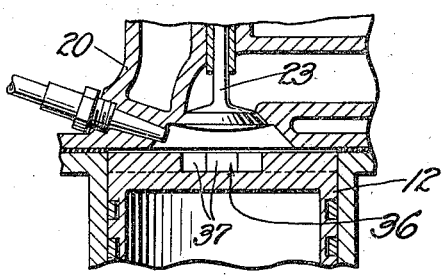
Fig. 2 is a fragmentary section similar to Fig. 1, showing the working piston substantially in its inner dead center position.

In order that the injected fuel is immediately and thoroughly atomized and forms with the air in recess 36 immediately a highly combustible charge, the fuel injector 32 is so inclined with respect to the cylinder axis that the fuel stream is directed transversely into the whirling air mass in said recess 36 as will be understood from Fig. 2. In this manner, the injected fuel is quickly and thoroughly atomized by the highly turbulent air in recess 36 and an instantaneous combustion will take place therein which instantaneously progresses into the grooves 37.

Figure 4:
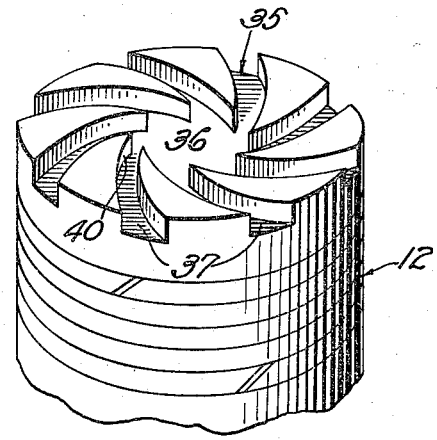
Fig. 4 is a fragmentary, perspective view of the working piston in the cylinder shown in Figs. 1 and 2.

It will be noticed in Fig. 3 that the grooves 37 in the piston head 35 redirect the air in the cylinder chamber 22 at an obtuse angle with respect to its initial whirling direction (see arrows $a$ and $b$ in Fig. 3), so that the air never reverses its movement. Also, in order gradually and continuously to redirect the air in the grooves 37 into the recess 36, and thereby avoid the formataion of turbulent air masses in said grooves which would obstruct the progress of the air therein toward and into the recess 36, said grooves are smoothly curved in the manner best illustrated in Figs. 3 and 4. In making these grooves 37 curved, they may also be made of a possible maximum length, with the result that a maximum amount of air may simultaneously impinge on the wall 40 of each of said grooves 37 and be redirected into the recess 36. The continuous redirection of the air in each groove, due to the curvature of the same, also produces continuous friction between said air and groove, with the result that the air becomes heated in addition to the heat produced by the compression of the air when the piston moves through its compression stroke. To obtain good results, the total cross-sectional area of the grooves 37 is preferably, but not imperatively, larger than one-half the cross-sectional area of the piston head 35 minus that of the recess 36.

Figure 5:
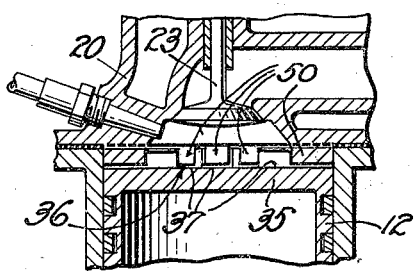
Fig. 5 is a fragmentary, longitudinal section through a cylinder, illustrating a modified embodiment of the present invention.

Fig. 5 illustrates a modified construction wherein ribs 50 on the cylinder head 20 interfit with the grooves 37 in the head 35 of the working piston 12 which may be exactly like the one shown in Figs. 1 to 4. In this construction, most of that air which remains in the grooves 37 in the construction shown in Figs. 1 to 4 is forced or "squeezed" by the ribs 50 into the annular recess 36.

Fig. 6 illustrates another modification in which a second or opposed piston 55 takes the place of the cylinder head 20 in the construction shown in Fig. 1. The two pistons 12 and 55 are operated in any conventional manner, and piston 12 is for all intents and purposes exactly like the piston shown in Figs. 1 to 4. The other opposed piston 55 is provided in its head 56 with a frusto-conical recess 57. A fuel duct 58 is also provided in the head 56 of the opposed piston 55 and leads from the periphery of said piston to the frusto-conical side wall of the recess 57. Suitably secured in the cylinder 60 is a fuel injector 61 with which the duct 58 of the opposed piston 55 aligns when both pistons 12, 55 are substantially in their inner dead center position, at which time any suitably operated fuel pump (not shown) forces a metered quantity of fuel through said injector and the therewith aligned duct 58 and into the annular recess 36 of the piston 12. The intake ports 16 in the cylinder 60 may be arranged exactly like those in the cylinder shown in Figs. 1 and 3. Instead of a poppet-type exhaust valve, the cylinder 60 is provided with exhaust ports 62 that are uncovered by the piston 55 at the proper times.

Fig. 7 illustrates another modification which fundamentally differs from the construction shown in Fig. 6 by sliding the piston 12 within the skirt 65 of an opposed piston 66. Both pistons 12, 66 are connected by conventional rods with the same crank shaft (not shown) in a well known manner. In the instant modification, the frusto-conical recess 57', into which the fuel duct 58 leads, is provided in the inner surface 67 of the head 68 of piston 66 for obvious reasons. Provided in the skirt 65 of the piston 66 are longitudinally spaced intake and exhaust ports 69 and 70, respectively, which communicate with corresponding ports 71 and 72, respectively, in the cylinder 73 when piston 66 is substantially in its outer dead center position. The intake ports 69 and 71 in the piston 66 and cylinder 73 may for all intents and purposes be arranged exactly like the intake ports 16 shown in Figs. 1 and 3.

Fig. 8 discloses a construction which is exactly like the one shown in Fig. 6, except that the air-redirecting grooves 37 are provided in the heads 75 and 76 of both pistons 77 and 78, respectively, whereby both pistons cooperate in redirecting the air in the cylinder so that the same finally whirls in one common direction in the aligned recesses 79 and 80 in the piston heads 75 and 76, respectively, when the pistons 77 and 78 are substantially in their inner dead center positions.

Fig. 9 discloses a construction which may for all intents and purposes be exactly like the construction shown in Fig. 7, except that the inner surface 67' of the head of the piston 66' is provided with ribs 85 that interfit with the grooves 37 in piston 12 when both pistons 12, 66' are substantially in their inner dead center position.

I claim:

1. In an internal combustion engine, the combination of a cylinder having tangential ports in its wall for conducting air into the cylinder so that the same whirls therein substantially about the cylinder axis; and two pistons in said cylinder operating in opposite directions, at least one of said pistons having in its head a recess and grooves converging from the piston periphery substantially tangentially into said recess and redirecting the air at an angle with its whirling direction into said recess during the compression stroke of said pistons.

2. In an internal combustion engine, the combination of a cylinder having tangential ports in its wall for conducting air into the cylinder so that the same whirls therein substantially about the cylinder axis; a reciprocating piston in said cylinder forming a chamber therein, said piston having in its head a recess and grooves exposed throughout their length to said chamber and converging from the piston periphery substantially tangentially into said recess to divert the whirling air into said recess substantially during the entire compression stroke of said piston; and ribs in the cylinder head registering with said grooves during the latter part of the compression stroke of said piston.

JOHN J. McCARTHY.